United States Patent

Sauter

Patent Number: 5,224,739
Date of Patent: Jul. 6, 1993

[54] DEVICE FOR CONNECTING A TAILPIPE TO AN EXHAUST PIPE

[75] Inventor: Udo Sauter, Malsch, Fed. Rep. of Germany

[73] Assignee: Deere & Company, Moline, Ill.

[21] Appl. No.: 916,053

[22] Filed: Jul. 20, 1992

[30] Foreign Application Priority Data

Jul. 20, 1991 [DE] Fed. Rep. of Germany ....... 4124204

[51] Int. Cl.$^5$ ............................................. F16L 27/10
[52] U.S. Cl. ..................................... 285/41; 285/177; 285/224; 285/391; 403/229; 411/411; 411/438; 411/424; 181/228
[58] Field of Search ........... 285/41, 177, 286, 223-224, 285/390-391; 403/229, 343; 411/411, 438, 424, 392, 383; 181/227, 228; 29/890.08, 450-451, 456

[56] References Cited

U.S. PATENT DOCUMENTS

| | | | |
|---|---|---|---|
| 368,372 | 8/1887 | Bingham | 411/411 X |
| 776,737 | 12/1904 | Greenfield | 29/456 X |
| 1,645,490 | 10/1927 | Keener | 285/390 X |
| 2,001,835 | 5/1935 | Cook | 29/451 |
| 2,459,918 | 1/1949 | Chester | 285/177 |
| 2,580,872 | 1/1952 | Wise | 285/390 |
| 2,620,893 | 12/1952 | Holt et al. | |
| 3,062,568 | 11/1962 | Andersen et al. | 403/343 X |
| 4,475,623 | 10/1984 | Gerber et al. | 181/228 X |
| 4,792,161 | 12/1988 | Usui | 285/223 X |
| 5,101,213 | 3/1992 | Harada et al. | 403/229 X |

FOREIGN PATENT DOCUMENTS

| | | | |
|---|---|---|---|
| 812487 | 8/1951 | Fed. Rep. of Germany | 411/411 |
| 2353914 | 5/1975 | Fed. Rep. of Germany | |
| 7838091 | 7/1979 | Fed. Rep. of Germany | |
| 3023758 | 8/1984 | Fed. Rep. of Germany | |
| 3436982 | 6/1988 | Fed. Rep. of Germany | |
| 2360028 | 2/1978 | France | |
| 2432671 | 4/1980 | France | 403/229 |
| 349549 | 5/1931 | United Kingdom | 285/390 |

Primary Examiner—Dave W. Arola
Assistant Examiner—Harry C. Kim

[57] ABSTRACT

A connecting device connects a tailpipe to an exhaust pipe of an internal combustion engine for a vehicle. The tailpipe includes a smaller diameter section and a larger diameter section, and the free end of the exhaust pipe is received by the larger diameter section of the tailpipe. An annular space separates the larger diameter section of the tailpipe and the free end of the exhaust pipe. Screw threads are formed on the free end of the exhaust pipe. A connecting spring is configured as a conical helical spring, the larger diameter end of which is fixed to the tailpipe. The other end of the spring has coils configured as screw threads which screwed onto the screw threads which are formed on the free end of the exhaust pipe. The spring is relatively soft in a direction parallel to an axis of the tailpipe, and is relatively stiff in a direction transverse to an axis of the tailpipe. The spring absorbs vibrations of the engine and centers the pipes with respect to each other.

7 Claims, 1 Drawing Sheet

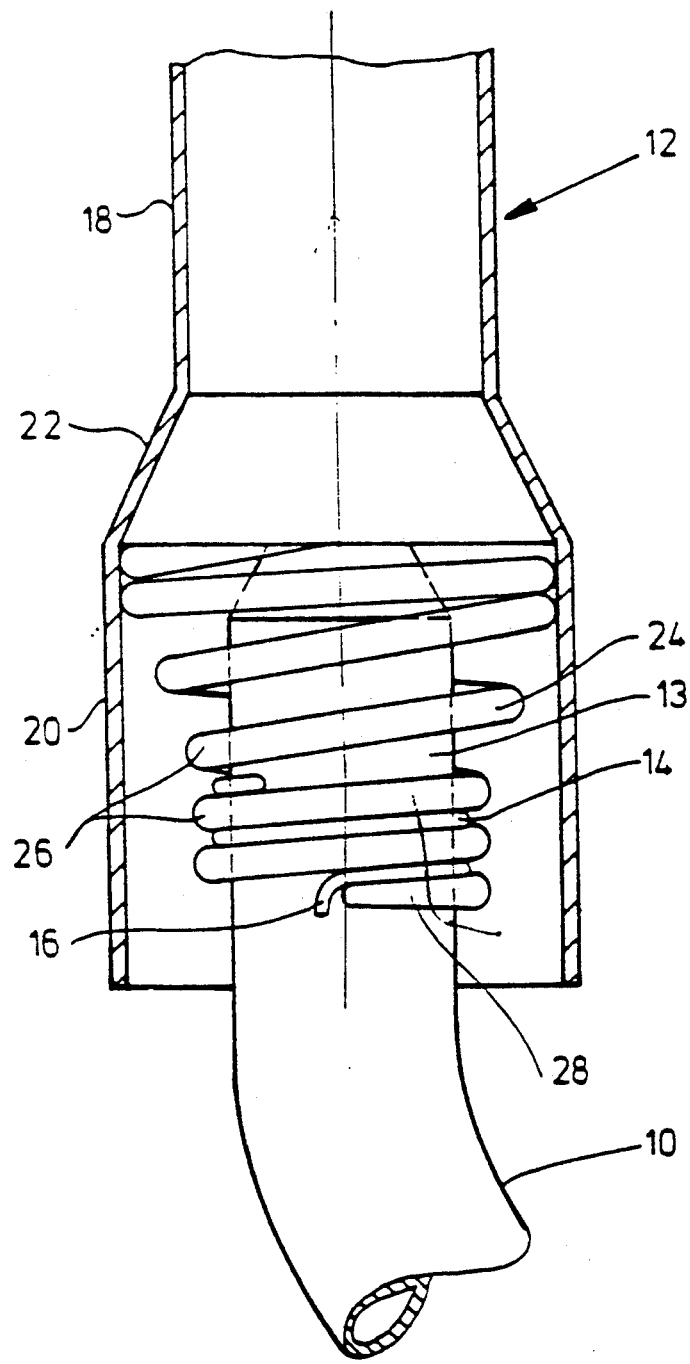

DEVICE FOR CONNECTING A TAILPIPE TO AN EXHAUST PIPE

BACKGROUND OF THE INVENTION

The invention relates to a connection between an exhaust pipe and a tailpipe of an internal combustion engine of a vehicle, in particular an agricultural or utility vehicle.

The exhaust gases of an elastically mounted internal combustion engine of a vehicle, such as an agricultural tractor, are conducted through an exhaust manifold to a muffler and then through an exhaust pipe and a tailpipe into the open air. In such an arrangement, the tailpipe frequently slides over the exhaust pipe so that it can easily be disconnected, as is revealed, for example, by German Patentschrift DE 3023758, published 12 Mar. 1981. The internal combustion engine is mounted elastically in the vehicle and, when operating, transmits strong vibrations to the exhaust pipe and the tailpipe. These vibrations make it difficult to apply long tailpipes, which, in addition, are burdened by high weight and hence require additional support. It would be desirable to provide a low cost connection between an exhaust pipe and a tailpipe which can withstand exposure to vibrations and which does not require additional support.

SUMMARY OF THE INVENTION

Accordingly, an object of this invention is to provide a low cost connection between an exhaust pipe and a tailpipe.

A further object of the invention is to provide such a connection which can withstand exposure to vibrations.

A further object of the invention is to provide such a connection which does not require additional support.

These and other objects are achieved by the present invention, wherein screw threads are formed on the free end of the exhaust pipe of an internal combustion engine for a vehicle. A conical helical spring has a larger diameter end which is fixed to and received by the tailpipe. The smaller end of the spring has coils configured as screw threads which are screwed onto the screw threads which are formed on the free end of the exhaust pipe. An annular space separates the larger diameter section of the tailpipe and the free end of the exhaust pipe. The spring is preferably relatively soft in a direction parallel to an axis of the tailpipe, and is relatively stiff in a direction transverse to an axis of the tailpipe. The spring absorbs vibrations of the engine and centers the pipes with respect to each other.

BRIEF DESCRIPTION OF THE DRAWINGS

The sole FIGURE is a partial sectional view of a connection between an exhaust pipe and a tailpipe according to the present invention.

DETAILED DESCRIPTION

Referring now to the sole FIGURE, there is shown a connection between an exhaust pipe 10 and a tailpipe 12. The lower part of the exhaust pipe 10 is for connecting to a muffler, (not shown), of an internal combustion engine (not shown). The other end 13 of the exhaust pipe 10 is cylindrical and directed vertically upward. A spiral-shaped wire 14 is attached by means of spot welding to the outer surface of the free end 13 in such a way as to form a spiral structure such as a screw thread. The lower end 16 of the wire 14 is angled downward from its helical direction and forms a thread stop. Thus, the wire 14 forms a threaded section with two or three turns at the free end 13 of the exhaust pipe 10. A thread stop may also be formed by a thickening of the exhaust pipe.

The cylindrical tailpipe 12 includes three concentric sections: a smaller diameter upper section 18, only shown partially, and a larger diameter lower section 20 joined together by a frustoconical middle section 22. The lower section 20 is arranged concentric around the cylindrical end 13 of the exhaust pipe 10.

A centering spring 24 is attached to the inside of the lower section 20 of the tailpipe 12 and is located entirely within the lower section 20. The centering spring 24 is generally configured as a conical, helical spring, whose upper, larger diameter coils are in contact with the inner surface of the lower section 20 of the tailpipe 12 close to the transition to the middle section 22 and are attached thereto by spot welding or crimping, for example. The centering spring 24 tapers from its larger diameter upper coils to smaller diameter lower coils which form a section 26 shaped as a straight helical screw thread with a constant coil diameter. The inside diameter of coils of section 26 is approximately equal to the outside diameter of the end 13 of the exhaust pipe 10. The pitch of the coils of the centering spring 24 is preferably equal to the pitch of the spiral-shaped wire 14.

The tailpipe 12 is connected to the exhaust pipe 10 by screwing the tailpipe 12 and the screw thread-shaped section 26 of the centering spring 24 onto the screw thread-shaped wire 14 of the exhaust pipe 10. The angled end 16 of the wire 14 operates as a stop that limits the screw engagement when the lower end 28 of the centering spring 24 is brought up against the end 16.

Upon start up of the engine the air is cold and no air flow exists. As a result, the heavy exhaust gas tries to leave the pipes at their lowest opening and not at the top of the tailpipe. This is undesirable. In particular, exhaust gas can flow through the gap between the free end 13 of the exhaust pipe 10 and the lower section 20 of the tailpipe 12. However, the centering spring 24 partially fills the gap between the free end 13 of the exhaust pipe 10 and the lower section 20 of the tailpipe 12 and thereby limits this undesirable flow of exhaust gas upon starting.

On the other hand, as the flow of exhaust gas increases, the exhaust gases will flow upward out of the exhaust pipe 10 and then through the tailpipe 12. This flow causes a pressure drop at the reduced diameter of the pipes (at the conical portion 22). The pressure drop creates a suction which draws fresh air into the lower end of the lower section 20 and through the gap. The cross-section reduction caused by the spring reduces this suction flow slightly, but the suction flow is sufficient to cool the tailpipe 12. Because of the gap there is no direct contact between the exhaust pipe 10 and the tailpipe 12. This also leads to the result of a relatively cold tailpipe 12.

Such a connecting/centering spring between an exhaust pipe and a tailpipe is particularly appropriate for long and heavy tailpipes which are rigidly attached to a vehicle cab.

Such a connecting/centering spring can be manufactured at low cost and permits easy assembly of the tailpipe to the exhaust pipe. Furthermore it can be configured so that rotation of the tailpipe is possible in order to vary the direction of the exhaust (for example, to the front, 45° to the right, 90°) etc.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A connecting device for connecting a tailpipe to an exhaust pipe of an internal combustion engine for a vehicle, the tailpipe includes a smaller diameter section and a larger diameter section having an interior surface, the exhaust pipe having a free end which is received by the larger diameter section, characterized by:

the tailpipe and the exhaust pipe being separated by an annular gap through which exhaust gases may flow, the connecting device comprises flexible spring, one end of the spring being secured to the interior surface of the larger diameter section of the tailpipe, another end of the spring being releasably coupled to the free end of the exhaust pipe, the spring being softer in a direction parallel to a longitudinal axis of the tailpipe, and stiffer in a direction transverse to said axis.

2. The connecting device of claim 1, wherein:
the spring is completely enclosed by the tailpipe.

3. The connecting device of claim 1, wherein:
at least a portion of the spring is configured as a conical helical spring, one end of which is secured to the exhaust pipe, the other end of which is secured to the tailpipe.

4. The connecting device of claim 1, wherein:
the spring comprises a first section with coils configured as a conical helical spring and a second section with coils configured as screw threads; and
the tailpipe includes a corresponding threaded section onto which the second section of the spring is screwed.

5. The connecting device of claim 4, wherein:
the tailpipe threaded section is formed by a wire which is fixed on an outer surface of the free end of the exhaust pipe, the wire having a helical screw thread shape.

6. The connecting device of claim 5, wherein:
an end of the wire is bent to form a stop which is engagable with the spring to limit screwing of the spring onto the tailpipe threaded section.

7. The connecting device of claim 1, wherein
the spring is rigidly attached to the tailpipe and is rotatably coupled to the exhaust pipe.

* * * * *